United States Patent [19]
Cuif

[11] Patent Number: 5,747,401
[45] Date of Patent: May 5, 1998

[54] CERIUM AND ZIRCONIUM OXIDES, MIXED OXIDES AND SOLID SOLUTIONS HAVING IMPROVED THERMAL STABILITY

[75] Inventor: Jean Pierre Cuif, Princeton, N.J.

[73] Assignee: Rhone-Poulenc Inc., Cranbury, N.J.

[21] Appl. No.: 730,554

[22] Filed: Oct. 15, 1996

[51] Int. Cl.$^6$ .................. C04B 35/48; C01G 57/00; C01G 25/02; C01F 17/00
[52] U.S. Cl. .................. 501/103; 501/152; 423/263; 423/265; 423/592; 423/593; 423/608
[58] Field of Search .................. 501/103, 152; 423/263, 265, 592, 593, 608

[56] References Cited

U.S. PATENT DOCUMENTS

| | | | |
|---|---|---|---|
| 4,605,631 | 8/1986 | Rossi | 501/152 |
| 4,810,680 | 3/1989 | Bickford et al. | 501/103 |
| 5,096,642 | 3/1992 | Shirasaki | 501/103 |
| 5,104,832 | 4/1992 | Michel et al. | 501/103 |
| 5,112,433 | 5/1992 | Dawson et al. | 423/593 |
| 5,571,492 | 11/1996 | Yao et al. | 423/263 |
| 5,580,536 | 12/1996 | Yao et al. | 423/263 |
| 5,582,785 | 12/1996 | Yao et al. | 423/263 |
| 5,626,826 | 5/1997 | Chopin et al. | 423/247 |

OTHER PUBLICATIONS

Zaitser, L.M. "Zirconium Hydroxides," Russian J. Inorg. Chem 11, 7, pp. 900–904, 1996. (no month).

Jones S.L. and C.J. Norman, "Dehydrogenation of Hydrous Zirconia with Methanol," J. Am. Ceram. Soc. 71, 4, c–190–191, 1988. (no month).

*Primary Examiner*—Michael Marcheschi
*Attorney, Agent, or Firm*—Katherine L. Carleton

[57] ABSTRACT

Mixed oxides of cerium and zirconium as well as solid solutions and cerium oxides are produced having improved thermal stability. The process involves the formation of cerium and zirconium oxides, mixed oxides and solid solutions by methods such as co-thermohydrolysis and co-precipitation, followed by washing or impregnating with an alkoxylated compound having greater than 2 carbon atoms. After the washing or impregnating step, the mixture is calcined to form oxides having very high surface area and oxygen storage capacity. The improved thermal stability of the oxides makes them advantageous for use in applications such as catalytic converters.

30 Claims, No Drawings

CERIUM AND ZIRCONIUM OXIDES, MIXED OXIDES AND SOLID SOLUTIONS HAVING IMPROVED THERMAL STABILITY

BACKGROUND OF THE INVENTION

1. Field of the Invention

The present invention relates particularly to the production of mixed oxides, and more particularly relates to the production of cerium and zirconium mixed oxides having improved thermal stability. The mixed oxides have fine particle size distribution, very high surface area, oxygen storage and release capacity, and are useful in many applications including catalytic converters.

2. Background Information

Mixed oxides of cerium and zirconium are used for many applications, including catalysts used in automotive catalytic converters and the like. Such cerium and zirconium mixed oxides are typically formed by known precipitation techniques which involve the formation of the solid oxides in a liquid medium. When such mixed oxides are to be used, for example, in catalytic converters, it is desirable to maximize the thermal stability of the compounds, as defined by the stability of the surface area of the material after aging at high temperature. It is also desirable to maximize the surface area of such mixed oxides in order to provide improved catalytic properties. In addition to mixed oxides the present invention also relates to cerium oxides, zirconium oxides, and cerium/zirconia solid solutions (where substitution between cerium and zirconium in the network of the oxide as opposed to being two different phases is one phase).

Most industrial processes which include the precipitation or the creation of a solid in a liquid medium involve a solid/liquid separation state. Filtration, decantation or centrifugation are among the known techniques used for this purpose. After the solid/liquid separation is completed, the so-called wet cake comprises precipitated particles and remaining mother liquor. In most of the processes, the mother liquor contains some salts that can contaminate the oxides generated during the next calcination operation. To reduce the amount of contaminants, washing is needed after the solid/liquid separation. In cases where the salts used as raw materials to make the precipitation are soluble in water, washing is typically carried out with water. The volume and temperature of water used for washing determine the purity of the material and its thermal stability as well.

Although such techniques have been used to produce cerium and zirconium mixed oxides, a need still exists for the production of such mixed oxides and solid solutions having substantially improved thermal stability. It is an object of the present invention to provide mixed oxides of improved thermal stability as well as cerium and zirconium oxides, preferably cerium oxides of improved thermal stability in addition to solid solutions having improved thermal stability.

SUMMARY OF THE INVENTION

One aspect of the invention is to provide a novel way to improve the thermal stability of cerium and zirconium oxides, $(Ce,Zr)O_2$ mixed oxides, solid solutions, and mixtures of cerium oxides and zirconium oxides, obtained by processes such as co-precipitation or thermohydrolysis, by introducing alkoxylated compounds by impregnating or in the washing solution of a filter cake during the solid/liquid separation. The cake resulting from the precipitation typically occurs in aqueous media. By washing or impregnating with an alkoxylated compound, thermal stability can be substantially improved. Impregnating involves not draining the cake and instead making a paste which is contacted with the alkoxylated compound.

An object of the present invention is to provide a method for producing cerium and zirconium oxides and mixed oxides, solid solutions and mixtures of oxides having improved thermal stability. The method is preferred for use in producing cerium oxides, cerium and zirconium mixed oxides and cerium and zirconium solid solutions having improved thermal stability. The method includes the steps of forming a mixture comprising a cerium and zirconium mixed oxide $((Ce, Zr)O_2)$ or a $(Ce,Zr)O_2$ solid solution or a cerium oxide $(CeO_2)$ or zirconium oxide $(ZrO_2)$, washing or impregnating with an alkoxylated compound, and drying or calcining the washed product. In a preferred embodiment, the product can be washed with water prior to washing with the alkoxylated compound. The alkoxylated compound is preferably provided in the form of an aqueous solution.

Another object of the present invention is to provide cerium and zirconium oxides, mixed oxides, mixtures of oxides and solid solutions having improved thermal stability. The oxides, mixed oxides and solid solutions have very high surface areas, very high oxygen storage capacities and low particle size.

These and other objects of the present invention will be more readily apparent from the following description.

All ratios, proportions and percentages herein are by weight, unless otherwise specified. "Comprising," as used herein, means various components can be conjointly employed. Accordingly, the terms "consisting essentially of" and "consisting of" are embodied in the term "comprising."

DETAILED DESCRIPTION OF THE PREFERRED EMBODIMENTS

The thermal stability of inorganic compounds can be defined as the stability of the surface area when material is aged at high temperature. For many applications, particularly catalysis, high surface area and highly stable materials are required by end users. In accordance with the present invention, cerium and zirconium mixed oxides and solid solutions are produced having improved thermal stability. The invention is also useful for producing cerium oxides, zirconium oxides and mixtures of cerium oxides and zirconium oxides having improved thermal stability.

The present invention relates to the use of alkoxylated compounds having greater than 2 carbon atoms during the washing or impregnating stage in order to improve the thermal stability of $(Ce,Zr)O_2$ mixed oxides and solid solutions. The alkoxylated compounds suitable for use herein have greater than 2 carbon atoms. The mixed oxides and solid solutions can be prepared by various conventional processes. Salts of Ce(III) and Zr(IV), nitrates for instance, can be mixed together and precipitated out by adding a base such as sodium hydroxide or ammonia. Adequate precipitation conditions must be used to obtain the mixed oxide phase after calcination at high temperature. Another process can involve the use of Ce(IV) as a starting material together with a Zr salt. This process also requires the use of a base as a precipitating agent. In any case, the precipitate has to be separated from the mother liquor. In the scope of the present invention, the solid is separated from the liquid by filtration or any other suitable method. In a preferred embodiment, the solid, otherwise called wet cake, is washed during a first stage with water to remove the water-soluble salts, nitrates for instance if nitrate solutions are the raw materials for the reaction. In a second stage of the preferred embodiment, the wet cake is washed or impregnated with a solution containing alkoxylated compounds such as ethoxylated alcohols, organic compounds or ethoxylated polymers such as PEG. Once washed or impregnated, the wet cake is either dried and calcined or directly calcined. The final product is a pure mixed oxide having substantially no organics since they are burned during calcination.

The $(Ce.Zr)O_2$ mixed oxides are initially formed by conventional processes such as co-thermohydrolysis or co-precipitation. Each of these processes is generally described separately below.

Co-thermohydrolysis

The first stage of the co-thermohydrolysis process involves preparing a mixture, in aqueous medium, of at least a soluble cerium compound and at least a soluble zirconium compound. The mixture can be obtained either from solid compounds which are dissolved in water, or directly from aqueous solutions of these compounds, followed by mixing, in any order, of the defined solutions.

Of the water soluble cerium compounds, one example is Ce IV salts, such as nitrates including ceric ammonium nitrate, that are suitable for the present invention. Preferably, a cerium nitrate is used. The cerium IV salt solution can contain some cerium III. However, it is preferred that the salt contains at least about 85% cerium IV. An aqueous solution of cerium nitrate can be obtained by reacting nitric acid with a hydrated ceric oxide, prepared by a standard reaction of cerium III salt solution, carbonate for instance, with an ammonia solution in the presence of hydrogen peroxide, an oxidizing agent.

The aqueous solution of cerium IV salt can have some free acid, for instance a normality ranging from 0.1 to 4N. In the present invention, it is possible to use either a solution containing some free acid or a pre-neutralized solution by addition of a base, such as an aqueous solution of ammonia or alkaline hydroxides, e.g., sodium, potassium, etc. Preferably an ammonia solution is used to reduce the free acidity. In this case, it is possible to define the neutralization rate (r) of the initial solution by the following equation:

$$r=(n_3-n_2)/n_1$$

wherein $n_1$ represents the total number of moles of Ce IV present in the solution after neutralization, $n_2$ represents the number of OH$^-$ ions effectively used to neutralize the initial free acidity from the Ce IV aqueous solution, and $n_3$ represents the total number of moles of OH$^-$ ions from the base added. When a neutralization step is used, excess base can be used in order to ensure the complete precipitation of the $Ce(OH)_4$ species. Preferably, r is lower than 1, more preferably about 0.5.

The soluble zirconium salts used in the invention can be, for instance, zirconium sulfate, zirconyl nitrate or zirconyl chloride.

The amount of cerium and zirconium contained in the mixture substantially corresponds to the stoichiometric proportion required to obtain the final desired composition.

Once the mixture is obtained, it is then heated. The thermal treatment, called thermohydrolysis, is carried out at a preferred temperature of between about 80° C. and the critical temperature of the reacting medium, typically between about 80° and about 350° C., more preferably between about 90° and about 200° C.

The heating stage can be carried out under air or under an inert gas such as nitrogen. Any suitable reaction time can be used, usually between about 2 and about 24 hours. The thermal treatment can be performed under atmospheric pressure or under any higher pressure such as the saturated vapor pressure. When the temperature is higher than the reflux temperature of the reaction medium (usually higher than about 100° C.), for instance between about 150° and about 350° C., the reaction is performed in a closed reactor or autoclave. The pressure can be equal to the autogenic pressure and can be correlated to the chosen temperature. It is also possible to increase the pressure in the reactor.

After the heating stage, a solid precipitate is recovered from the reactor and separated from the mother liquor by any process known by the state of art, for example filtration, settling or centrifugation.

If required, some additional base can be added directly after the heating stage into the reaction medium in order to improve the yield of the reaction. The obtained precipitate can be washed or impregnated with one or several alkoxylated compounds, as more fully described below. In one embodiment, the precipitate is then dried, under air conditions for instance, at a temperature ranging from about 80° to about 300° C., preferably from about 100° to about 150° C. The drying stage is preferably performed until substantially no more weight loss is observed.

After the optional drying step, the recovered precipitate is then calcined. This allows the formation of a crystalline solid solution phase. Usually, the calcination is carried out at temperatures ranging from about 200° to about 1000° C. The calcination temperature is typically higher than about 300° C., and preferably ranges from about 400° to about 800° C.

Co-precipitation

The first stage of the co-precipitation process is the preparation of a mixture in an aqueous medium of at least a soluble cerium compound and at least a soluble zirconium compound. The mixture can be obtained either from solid compounds which are dissolved in water, or directly from aqueous solutions of these compounds, followed by mixing, in any order, of the defined solutions.

Suitable water soluble cerium compounds include cerium III salts, like nitrates or chlorides, for instance.

The soluble zirconium salts used in the invention can be, for instance, zirconium sulfate, zirconyl nitrate or zirconyl chloride.

The amount of cerium and zirconium contained in the mixture must correspond to the stoichiometric proportion required to obtain the final desired composition. Hydrogen peroxide can be added to the cerium/zirconium mixture or to the cerium or zirconium salt before mixing together. The effect of hydrogen peroxide is to oxidize at least part of Ce III to Ce IV.

Once the mixture is prepared, a base can be added to the cerium/zirconium salt solution to precipitate out the hydroxides. The base can be an ammonia solution or alkaline hydroxide solution, e.g., sodium, potassium, etc. The base solution used can, in particular, be an aqueous solution of ammonia or of sodium or potassium hydroxide. Ammonia solution is preferably used.

The precipitation is carried out on a batch or continuous basis. In the case of a continuous precipitation, the pH of the reaction is typically maintained between about 7 and about 11, preferably between about 7.5 and about 9.5. The residence time of the material in the reactor is typically at least about 15 minutes, preferably about 30 minutes. The reaction can be carried out at any suitable temperature such as room temperature. In the case of batch precipitation, the amount of base added is preferably at least the amount required to precipitate out $Ce(OH)_4$ and $Zr(OH)_4$.

After the reaction stage, a solid precipitate is recovered from the reactor and separated from the mother liquor by any process known by the state of art, for example filtration, settling or centrifugation. The obtained precipitate can then be washed or impregnated with one or several alkoxylated compounds, as described below.

The next stage of the process is calcination of the washed material, either with or without an intermediate drying step. This allows the formation of a crystalline solid solution phase. Usually, the calcination is carried out at temperatures ranging from about 200° to about 1000° C. Calcination temperatures of greater than about 300° C. are suitable, preferably ranging from about 350° to about 800° C.

The alkoxylated compounds of the present invention can be defined by the general formula:

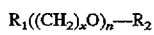

wherein $R_1$ and $R_2$ represent linear or non-linear alkyl groups or H or OH or Cl or Br or I; n is a number from 1 to 100; and x is a number from 1 to 4. $R_1$ and $R_2$ can contain an alcohol group. Of the alkyl groups, methoxy, ethoxy and propoxy groups are preferred in order to generate an improvement in the thermal stability of the $(Ce,Zr)O_2$ mixed oxides and solid solutions.

The alkoxylated compound can be of the formula:

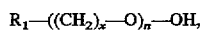

wherein $R_1$ is selected from the group consisting of linear and nonlinear alkyl groups having from 1 to 20 carbons and fatty hydrocarbon residues having from 8 to 20 carbons, n is from 1 to 100, and x is from 1 to 4. Preferably, n is from 12 to 40 and x is from 1 to 3. More preferably, x is 2.

The alkoxylated compound can be of the formula:

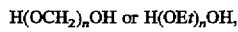

wherein the average of n is from 1 to 100.

Examples of suitable alkoxylated compounds can be of the formulae:

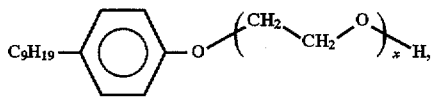

wherein the average of x is 9 or from 4 to 15;

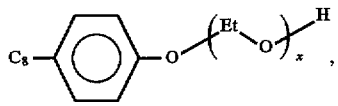

wherein the average of x is 12.5;

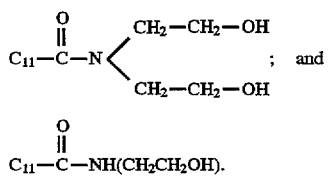

Commercially available alkoxylated compounds suitable for use are sold by Rhône-Poulenc Inc. under the tradenames: IGEPAL CO 630, IGEPAL CA 720, ALKAMIDE LE, and ALKAMIDE L203.

The alkoxylated compound can alternatively be of the formula:

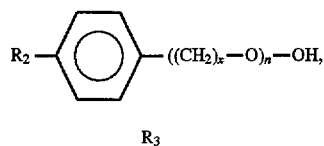

wherein $R_2$ and $R_3$ are the same or different and are independently selected from the group consisting of hydrogen and linear and nonlinear alkyl groups having from 1 to 20 carbons, n is from 1 to 100, and x is from 1 to 4. Preferably, n is from 12 to 40 and x is from 1 to 3. More preferably, x is 2.

The alkoxylated compound can further be of the formula:

wherein $R_4$ is selected from the group consisting of linear and nonlinear alkyl groups having from 1 to 20 carbons, n is from 1 to 100, and x is from 1 to 4. Preferably, n is from 12 to 40 and x is from 1 to 3. More preferably, n is 3, and x is 2.

The alkoxylated compound can further be of the formula:

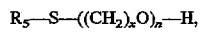

wherein $R_5$ is selected from the group consisting of linear and nonlinear alkyl groups having from 1 to 20 carbons, n is from 1 to 100, and x is from 1 to 4. Preferably, n is from 4 to 40 and x is from 1 to 3. More preferably, x is 2.

The alkoxylated compound can also be of the formula:

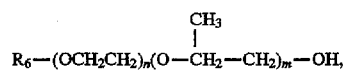

wherein $R_6$ is selected from the group consisting of linear and nonlinear alkyl groups having from 1 to 20 carbons, n is from 1 to 100, and m is from 0 to 300 preferably 0 to 100. Preferably, n is from 12 to 40 and m is from 1 to 40.

The alkoxylated compound can alternatively be of the formula:

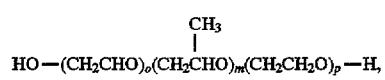

wherein o is from 0 to 300, m is from 0 to 300, and p is from 0 to 300.

The alkoxylated compound can further be of the formula:

wherein $R_7$ is selected from the group consisting of linear and nonlinear alkyl groups having from 1 to 20 carbons, n is from 1 to 100, and x is from 1 to 4. Preferably, n is from 4 to 40 and x is from 1 to 3. More preferably, x is 2.

The alkoxylated compound can further be of the formula:

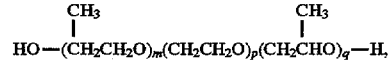

wherein m is from 0 to 300, p is from 0 to 300, and q is from 0 to 300 and having an average molecular weight of from about 40 to about 8,000.

In accordance with the present invention, the alkoxylated compound can comprise nonionic compounds. For example, the alkoxylated compound can comprise, or be derived from, compounds as listed below:

Polyoxyalkylenated (polyethoxyethylenated, polyoxypropylenated, polyoxybutylenated) alkylphenols in which the alkyl substituent is $C_6$–$C_{12}$ and containing from 5 to 25 oxyalkylene units; examples include TRITONS X-45, X-114, X-100 and X-102, marketed by Rohm & Haas Co.;

glucosamide, glucamide, and glycerolamide;

polyoxyalkylenated $C_6$–$C_{22}$ aliphatic alcohols containing from 1 to 25 oxyalkylene (oxyethylene, oxypropylene) units; examples include TERGITOL 15-S-9 and TERGITOL 24-L-6, marketed by Union Carbide Corp.; NEODOL 45-9, NEODOL 23-65, NEODOL 45-7 and NEODOL 45-4, marketed by Shell Chemical Co.; and Kyro KOB marketed by the Procter & Gamble Co.;

the products resulting from the condensation of ethylene oxide, the compound resulting from the condensation of propylene oxide with propylene glycol, such as the PLURONICS marketed by BASF;

the products resulting from the condensation of ethylene oxide, the compound resulting from the condensation of propylene oxide with ethylenediamine, such as the TETRONICS marketed by BASF;

amine oxides such as ($C_{10}$–$C_{18}$ alkyl) dimethylamine oxides and ($C_6$–$C_{22}$ alkoxy) ethyldihydroxyethylamine oxides;

the alkylpolyglycosides described in U.S. Pat. No. 4,565,647;

$C_6$–$C_{20}$ fatty acid amides;

$C_6$–$C_{20}$ alkamides, preferably utilized at low concentrations;

ethoxylated fatty acids; and ethoxylated amines.

The alkoxylated compound of the present invention can advantageously be provided in the form of an aqueous solution having a relatively minor amount of the alkoxylated compound. The alkoxylated compound preferably comprises less than about 50 wt. % of the aqueous solution, and more preferably comprises from about 0.1 to about 30 wt. % of the aqueous solution. A preferred commercially available compound suitable for use is sold by Rhône-Poulenc Inc. under the tradename IGEPAL 41.

The final calcined mixture produced in accordance with the present invention typically has a weight ratio of $CeO_2$ to $ZrO_2$ of from about 0:100 to about 100:0, preferably from about 95:5 to about 5:95. The resultant calcined mixture has a very high surface area, for example, greater than about 50m²/g. The final calcined mixed oxides also have a very high oxygen storage capacity, for example, greater than about 3ml $O_2$/g.

The surface area of the mixed oxides produced in accordance with the present invention is designated as B.E.T. determined by nitrogen adsorption according to the standard procedure ASTM D 3663-78 established from the method by BRUNAUER -EMMET - TELLER described in *Journal of the American Chemical Society*, 60, 309 (1938). Thermal stability is designated as the surface area of any powdery inorganic material after aging at a given temperature for a certain time. In the current invention, 10 g of material are calcined in a muffle furnace for about 6 hours at about 900° C. After this aging stage, the surface area of the material was measured by the method previously described.

The following examples illustrate various aspects of the invention and are not intended to limit the scope thereof.

EXAMPLE 1

Using a co-precipitation method from a nitrate solution of cerium and zirconium, a mixed oxide is prepared of the composition: 75 wt % $CeO_2$ and 25 wt % $ZrO_2$. The prepared nitrate solution comprises:

Ce(NO$_3$)$_3$*—2856.24 g,
ZrO(NO$_3$)$_2$*—2097.96 g,
H$_2$O$_2$(30%H$_2$O$_2$)—568.92 g and
Deionized Water—8205.60 g;

* Rare Earth Lanthanide Series impurities such as Nd(NO$_3$)$_3$, Pr(NO$_3$)$_3$, and/or La(NO$_3$)$_3$ can be present in an amount of about 124 g.

with the components being mixed well until homogenous.

The prepared ammonia solution comprises:

ammonia solution (29.8% NH$_3$)—1394.4 g, and
Deionized water—10365.6 g;

with the components being mixed well until homogenous.

The nitrate solution is added to the ammonium solution to precipitate out the hydroxides. The pH of the reaction is maintained between about 7 and 11. The temperature is room temperature. By reacting the appropriate salts and adding ammonia, the mixed hydroxides, corresponding to about 30 g of dried rare earth oxides, are precipitated out from the solution and filtered on a Buchner filter. The cake is washed with about 750 ml of deionized water, then calcined for about 2 hours at about 400° C. The thermal stability of the product is evaluated after calcination in a muffle furnace at about 900° C. for about 6 hours, and the surface area is measured using the B.E.T. method. The surface area of two repeated experiments is about 39.8 and about 41.7 m²/g, respectively.

The conditions are repeated, except instead of directly calcining the wet cake at about 400° C., a pre-drying stage is carried out at about 120° C. for about 1 hour. The surface area measured after calcination at about 900° C. for about 6 hours is about 36.6 m²/g.

EXAMPLE 2

Example 1 is repeated but the washing solvent is an alkoxylated compound sold under the designation DOWANOL TBH by Dow Chemical Corp. containing an n-butanol chain with a 3 ethoxy group (3EO) or higher. After filtration, the wet cake is washed with about 375 ml of water and then with about 375 ml of a 20% compound solution comprising 20 wt % of the alkoxylated compound and 80 wt. % water. The surface area after calcination at about 900° C. for about 6 hours is about 51.7 m²/g.

EXAMPLE 3

The conditions of Example 1 are repeated but another alkoxylated compound is used comprising a 2 ethylhexyl alcohol with 3EO sold under the designation RHODASURF by Rhône-Poulenc Inc. The wet cake is impregnated with about 375 ml of deionized water and about 375 ml of a solution comprising 20 wt. % of the compound and 80 wt. % water. The surface area after calcination at about 900° C. for about 6 hours is about 47.6 m²/g.

EXAMPLE 4

In this Example, three alkoxylated compounds are compared with various EO contents: DOWANOL, DOWANOL DB and DOWANOL TBH, n-butanol containing, respectively, 1, 2, and 3 and higher EO. The wet cake is prepared as in Example 1 and is washed with about 375 ml of pure water and then with about 375 ml of a 20 wt % solution of compound. The surface areas after calcination at about 900° C. for about 6 hours for the three products are about 45.2, about 49.0 and about 51.7 m²/g, respectively, for the compound containing 1, 2, and 3 and higher EO. The efficiency of the compound washing is correlated to the number of EO groups per organic chain. Thus, even better results can be achieved using molecules containing more than 3 ethoxy groups.

In the following examples, the oxygen buffer ability of mixed oxides produced by different methods are assessed by evaluating oxygen storage capacity in an oxidizing medium and oxygen release capacity in a reducing medium. The test assesses the ability of the product to be oxidized in contact with pulses of oxygen and to be reduced in contact with pulses of carbon monoxide. The carrier gas is pure helium at 10 l/h. Injections of gas are done by 16 ml volume pulses. Pulses of CO are carried out with 5% CO diluted in helium, while pulses of $O_2$ are carried out by a mixture of 2.5% $O_2$ in Helium. The gas analysis is performed by chromatography using a thermal conductivity detector. The amount of consumed oxygen leads to the oxygen storage capacity value. The specific value of oxygen storage capacity is expressed as ml of oxygen per gram of material used and is measured at about 400° C.

EXAMPLE 5

Using a co-precipitation method from a nitrate solution of cerium and zirconium, a mixed oxide is prepared of the composition: 80 wt. % $CeO_2$ and 20 wt. % $ZrO_2$. The prepared nitrate solution comprises:

$Ce(NO_3)_3$ 30.31% $CeO_2$: 2309.47 g, $ZrO(NO_3)_2$ 14.3% $ZrO_2$: 699.30 g, $H_2O_2$ 31.75% $H_2O_2$: 435.75 g, and Deionized Water: 5778.98 g;

with the components being mixed well until homogenous.

The prepared ammonia solution comprises:

Ammonia Solution 29.8% $NH_3$: 947.96 g, and

Deionized Water: 6876.00 g;

with the components being mixed well until homogenous.

The nitrate solution is added to the ammonia solution to precipitate out the hydroxides. The pH of the reaction is maintained between about 7 and about 11 and the temperature is room temperature. By reacting the salt mixture and adding ammonia, the mixed hydroxides, corresponding to 30 g of dried rare earth oxides, are precipitated out from the solution and filtered on a Buchner filter. The cake is washed with about 750 ml of deionized water, then calcined at about 400° C. for about 1 hour. The thermal stability of the product is evaluated after calcination in a muffle furnace at about 900° C. for about 6 hours and the surface area is measured. The surface area of the aged product is about 33 $m^2/g$ and the oxygen storage capacity is about 1.75 ml $O_2/g$.

EXAMPLE 6

The experiment described in Example 5 is repeated, except, instead of just washing the cake with water, an additional impregnating stage is included. After water washing, the cake (30 g as Rare Earth oxides) is impregnated with about 40 g, of a DOWANOL TBH ethoxylated butanol and then calcined at about 600° C. for about 2 hours. The thermal stability of the product is evaluated after calcination in a muffle furnace at about 900° C. for about 6 hours and the surface area is measured. The surface area of the aged product is about 42 $m^2/g$ and the oxygen storage capacity is about 2.85 ml $O_2/g$.

EXAMPLE 7

In this example, we prepare a mixed oxide with the following composition $Ce_{0.5}Zr_{0.5}$ from the co-thermohydrolysis method. In a 25-L glass autoclave (Dietrich) mix the stoechiometric amount of (a) a Ce(IV) nitrate solution with a free acidity of 0.62N and (b) a solution of zirconium nitrate. The total oxide concentration in the reactor is about 80 g/l. The mixture is then heated at about 150° C. for about 4 hours in the autoclave under constant stirring. A solution of ammonia is then added to the obtained suspension to raise the pH to 9.5. The pH adjusted solution is stirred for about 30 minutes. The precipitate is separated from the mother liquor by settling and then re-slurried into water. The suspension is heated at about 100° C. for about 2 hours. The mixed oxides are filtrated.

In one case, the wet cake is washed with water only (about 375 ml for about 30 g of dried Rare Earth oxides). The surface area of the product calcined for about 6 hours at about 900° C. is about 34 $m^2/g$.

In another case, the wet cake is washed with water under the conditions described before and impregnated with about 40 g of surfactant (IGEPAL CO-630). The surface area of the product calcined for about 6 hours at about 900° C. is about 48 $m^2/g$.

The compositions of the present invention can be used utilizing known techniques in the art for catalysis of gas exhaust systems and more particularly for catalytic converters.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A composition comprising cerium oxides, zirconium oxides, mixed oxides or solid solutions thereof produced by a method comprising the steps of:

a) forming a mixture comprising cerium and zirconium mixed oxides, cerium oxides, zirconium oxides, cerium and zirconium solid solutions or mixtures thereof;

b) washing or impregnating the mixture with at least one alkoxylated compound having greater than 2 carbon atoms; and c) calcining the washed or impregnated mixture.

2. The composition of claim 1, wherein the mixture is formed by co-thermohydrolysis.

3. The composition of claim 1, wherein the mixture is formed by co-precipitation.

4. The composition of claim 1, wherein the mixed oxides have a weight ratio of $CeO_2$ to $ZrO_2$ of from about 100:0 to about 5:95.

5. The composition of claim 1, wherein the mixed oxides have a surface area measured after calcination at about 900° C. for about six hours of greater than about 50 $m^2/g$.

6. The composition of claim 1, wherein the mixed oxides have an oxygen storage capacity of greater than about 2.5 ml $O_2/g$.

7. The composition of claim 6, wherein the mixed oxides have an oxygen storage capacity of greater than about 2.6 ml $O_2/g$.

8. The composition of claim 1, wherein the alkoxylated compound is of the formula:

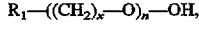

wherein $R_1$ is selected from the group consisting of linear and nonlinear alkyl groups having from 1 to 20 carbons and fatty hydrocarbon residues having from 8 to 20 carbons, n is from 1 to 100, and x is from 1 to 4.

9. The composition of claim 8, wherein the alkoxylated compound has an n of from 4 to 40 and x of from 1 to 3.

10. The composition of claim 9, wherein the alkoxylated compound has an x of 2.

11. The composition of claim 1, wherein the alkoxylated compound is of the formula:

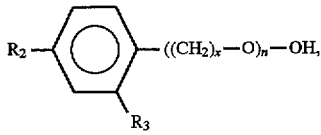

wherein $R_2$ and $R_3$ are the same or different and are independently selected from the group consisting of hydrogen and linear and nonlinear alkyl groups having from 1 to 20 carbons, n is from 1 to 100, and x is from 1 to 4.

12. The composition of claim 11, wherein the alkoxylated compound has n of from 4 to 40 and x of from 1 to 3.

13. The composition of claim 12, wherein the alkoxylated compound has a x of 2.

14. The composition of claim 1, wherein the alkoxylated compound is of the formula:

wherein $R_4$ is selected from the group consisting of linear and nonlinear alcohol groups having from 1 to 20 carbons, n is from 1 to 100, and x is from 1 to 4.

15. The composition of claim 14, wherein the alkoxylated compound has an n of from 12 to 40 and x of from 1 to 3.

16. The composition of claim 14, wherein $R_4$ is 2-ethylhexyl alcohol, n is 3, and x is 2.

17. The composition of claim 1, wherein the alkoxylated compound is of the formula:

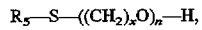

wherein $R_5$ is selected from the group consisting of linear and nonlinear alkyl groups having from 1 to 20 carbons, n is from 1 to 100, and x is from 1 to 4.

18. The composition of claim 17, wherein the alkoxylated compound has an n of from 12 to 40 and x of from 1 to 3.

19. The composition of claim 18, wherein x is 2.

20. The composition of claim 1, wherein the alkoxylated compound is of the formula:

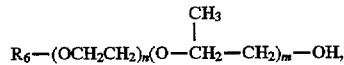

wherein $R_6$ is selected from the group consisting of linear and nonlinear alkyl groups having from 1 to 20 carbons, n is from 1 to 100, and m is from 0 to 200.

21. The composition of claim 20, wherein the alkoxylated compound has an n of from 12 to 40 and m of from 0 to 100.

22. The composition of claim 1, wherein the alkoxylated compound is of the formula:

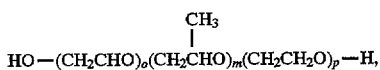

wherein o is from 0 to 300, m is from 0 to 300, and p is from 0 to 300.

23. The composition of claim 1, wherein the alkoxylated compound is of the formula:

wherein $R_7$ is selected from the group consisting of linear and nonlinear alkyl groups having from 1 to 20 carbons, n is from 1 to 100, and x is from 1 to 4.

24. The composition of claim 23, wherein the alkoxylated compound has an n of from 12 to 40 and x of from 1 to 3.

25. The composition of claim 24, wherein x is 2.

26. The composition of claim 1, wherein the alkoxylated compound is of the formula:

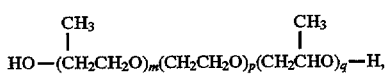

wherein m is from 0 to 300, p is from 0 to 300, and q is from 0 to 300.

27. The composition of claim 1, wherein the alkoxylated compound is provided as an aqueous solution and the alkoxylated compound comprises less than about 50 weight percent of the aqueous solution.

28. The composition of claim 27, wherein the alkoxylated compound comprises from about 10 to about 30 weight percent of the aqueous solution.

29. The composition of claim 1, wherein the washed mixture is calcined at a temperature of greater than about 300° C.

30. The composition of claim 29, wherein the method for producing the composition further comprises drying the washed mixture at a temperature of less than about 300° C. prior to calcining the washed mixture.

* * * * *